(12) United States Patent
Song

(10) Patent No.: US 12,253,751 B2
(45) Date of Patent: Mar. 18, 2025

(54) INTELLIGENT INTERACTIVE BOARD

(71) Applicants: Guangzhou Shiyuan Electronic Technology Company Limited, Guangdong (CN); GUANGZHOU SHIRUI ELECTRONICS CO. LTD., Guangdong (CN)

(72) Inventor: Gaobo Song, Guangdong (CN)

(73) Assignees: Guangzhou Shiyuan Electronic Technology Company Limited, Guangdong (CN); GUANGZHOU SHIRUI ELECTRONICS CO. LTD, Guangdong (CN)

( * ) Notice: Subject to any disclaimer, the term of this patent is extended or adjusted under 35 U.S.C. 154(b) by 0 days.

(21) Appl. No.: 18/285,414

(22) PCT Filed: Apr. 30, 2021

(86) PCT No.: PCT/CN2021/091729
§ 371 (c)(1),
(2) Date: Oct. 3, 2023

(87) PCT Pub. No.: WO2022/227078
PCT Pub. Date: Nov. 3, 2022

(65) Prior Publication Data
US 2024/0184154 A1    Jun. 6, 2024

(51) Int. Cl.
*G02F 1/1333* (2006.01)
*G06F 3/044* (2006.01)
*G02F 1/1335* (2006.01)

(52) U.S. Cl.
CPC .... *G02F 1/13338* (2013.01); *G02F 1/133308* (2013.01); *G06F 3/044* (2013.01); *G02F 1/1335* (2013.01)

(58) Field of Classification Search
CPC ........... G02F 1/13338; G02F 1/133308; G02F 1/1335; G06F 3/044
See application file for complete search history.

(56) References Cited

U.S. PATENT DOCUMENTS 11,150,500 B2 * 10/2021 Shen ................. G02F 1/133308
11,181,683 B2 * 11/2021 Shi ........................ G02B 6/0065
(Continued)

FOREIGN PATENT DOCUMENTS

| CN | 104570482 A | 4/2015 |
|---|---|---|
| CN | 109375835 A | 2/2019 |

(Continued)

OTHER PUBLICATIONS

International Search report and Written Opinion received for PCT Patent Application No. PCT/CN2021/091729, mailed on Jan. 29, 2022, 12 pages including English translation.
(Continued)

*Primary Examiner* — Peter D McLoone
(74) *Attorney, Agent, or Firm* — Zhong Law, LLC

(57) ABSTRACT

The present disclosure relates to an interactive intelligent board with a first fixing part and a second fixing part spaced apart on an inner wall of the frame. The touch display assembly is fixedly arranged on the first fixing part, while an optical diaphragm, a diffuser plate, a luminous assembly, and a backplane are successively fixedly arranged on a side of the second fixing part away from the first fixing part. The present disclosure avoids a need of a large adhesive area and the need for adding a middle frame for isolation, thereby reducing the frame width and increasing an effective display area ratio.

10 Claims, 4 Drawing Sheets

(56) References Cited

U.S. PATENT DOCUMENTS

2014/0268654 A1     9/2014  Wagner
2020/0409207 A1*   12/2020  Shen ................. G02F 1/133308
2021/0026058 A1*    1/2021  Shi .......................... G02B 6/005

FOREIGN PATENT DOCUMENTS

| | | |
|---|---|---|
| CN | 210090872 U | 2/2020 |
| CN | 210515083 U | 5/2020 |
| JP | H11142818 A | 5/1999 |
| JP | 2012083617 A | 4/2012 |
| JP | 2014102476 A | 6/2014 |
| JP | 2014178552 A | 9/2014 |
| JP | 2014215351 A | 11/2014 |
| JP | 2015153320 A | 8/2015 |
| JP | 2019536191 A | 12/2019 |
| KR | 20200047604 A | 5/2020 |
| WO | 2010146931 A1 | 12/2012 |
| WO | 2018123797 A | 7/2018 |

OTHER PUBLICATIONS

Notice of refusal received for JP Application No. 2023-564418, dated Jul. 29, 2024.
Search report received for JP Application No. 2023-564418, dated Jun. 20, 2024.
Notice of refusal received for JP Application No. 2023-564418, dated Jan. 21, 2025.
Notice of Preliminary Rejection received for KR Application No. 10-2023-7035109, dated Jan. 15, 2025.

* cited by examiner

INTELLIGENT INTERACTIVE BOARD

CROSS-REFERENCE TO RELATED APPLICATION

This application is the U.S. National Phase under 35. U.S.C. § 371 of International Application PCT/CN2021/091729, filed on Apr. 30, 2021, the content of which is incorporated herein by reference in its entirety.

TECHNICAL FIELD

The present disclosure relates to the field of computer technology, and in particular to an interactive intelligent board.

BACKGROUND

An interactive intelligent board is an integrated intelligent apparatus that controls a content displayed on the board through touch technology, thereby achieving human-computer interaction.

Currently, interactive intelligent boards are often packaged in a manner of wrapping an edge with a frame 1', as shown in FIG. 1 which is a structural schematic diagram of an interactive intelligent board in the current technology. Within the frame 1', the interactive intelligent board is successively arranged with a glass cover plate 2', a touch display assembly 3', an optical diaphragm 4', and a backplane 5'. When a structural edge is wrapped with the frame 1', the glass cover plate 2' mainly relies on a fixing support 6' and adhesive bonding to prevent detachment. Due to the fact that the glass fixing support 6' does not allow direct force on the touch display assembly 3', the glass cover plate 2' needs to protrude a certain width towards the direction of the fixing support 6' to facilitate adhesion. To avoid direct contact between the optical diaphragm 4' and the touch display assembly 3' and to protect the touch display assembly 3', a middle frame 8' needs to be added. The optical diaphragm 4' is pressed upon by the middle frame 8' to prevent displacement along its thickness. Then the positioning column 7' is riveted on the backplane 5' to secure the optical diaphragm 4' and prevent displacement along its width. Therefore, based on the above structure, the edges of the interactive intelligent board may create black bands in the Region A shown in FIG. 1, which affects the visual effects and usage experience of users.

SUMMARY

The purpose of the present disclosure is to provide an interactive intelligent board having a narrow frame and a large effective display area ratio.

According to the present disclosure, an interactive intelligent board is provided, including a frame, a touch display assembly, an optical diaphragm, a diffuser plate, a luminous assembly, and a backplane:

- where a first fixing part and a second fixing part are arranged on an inner wall of the frame at an interval along a thickness direction of the touch display assembly;
- the touch display assembly is fixedly arranged on the first fixing part;
- the optical diaphragm, the diffuser plate, the luminous assembly, and the backplane are successively fixedly arranged on a side of the second fixing part being away from the first fixing part.

The present disclosure provides an interactive intelligent board, wherein a first fixing part is provided on the inner wall of the frame to secure the touch display assembly, and a second fixing part is provided to secure the optical diaphragm, thereby preventing direct contact between the touch display assembly and the optical diaphragm, thereby avoiding the need for a large adhesive area caused by using a fixing support and glue fixation. It also avoids the need of adding a middle frame to isolate the touch display assembly and the optical diaphragm. It further solves a problem of wider frames and smaller effective display area ratio caused by the use of a middle frame to press the optical diaphragm in the current technology.

BRIEF DESCRIPTION OF THE DRAWINGS

In FIG. 1:

1'. Frame; 2'. Glass cover plate; 3'. Touch display assembly; 4'. Optical diaphragm; 5'. Backplane; 6'. Fixing support; 7'. Positioning column; 8'. Middle frame.

In FIGS. 2 to 7:

1. Frame; 101. Sub-frame; 102. Corner fixing member; 11. First fixing part; 12. Second fixing part; 121. Male plug; 13. Sub-frame fixing plate; 131. Sub-frame fixing screw hole; 14. Fixing piece; 141. Corner fixing screw hole; 15. Backplane fixing part; 151. Backplane fixing screw hole; 2. Touch display assembly; 3. Optical diaphragm; 4. Diffuser plate; 5. Luminous assembly; 6. Backplane.

The implementation, functional features, and advantages of the present disclosure may be further explained in conjunction with the embodiments, with reference to the accompanying drawings.

DETAILED DESCRIPTION OF EMBODIMENTS

To make the purpose, technical solution, and advantages of the present disclosure clearer, the present disclosure may be described in detail hereinafter in conjunction with the accompanying drawings and embodiments. It may be understood that the optional embodiments described herein are merely used to explain the present disclosure and are not intended to limit it.

Those skilled in the art may understand that, unless specifically stated, the singular forms "a", "an", "the above", and "this" used herein may also include the plural forms. It may be further understood that the wording "including" used in the description of the present disclosure refers to the presence of features, integers, steps, operations, elements, units, modules, and/or assemblies, but does not exclude the presence or addition of one or more other features, integers, steps, operations, elements, units, modules, assemblies, and/or their groups. It may be understood that when an element is referred to as "connected" or "coupled" to another element, it can be directly connected or coupled to other elements, or there can also be intermediate elements. In addition, the term "connection" or "coupling" used herein can include wireless connection or wireless coupling. The term "and/or" used herein includes any unit and combinations of one or more associated listed items.

Those skilled in the art can understand that, unless otherwise defined, terms used herein (including technical and scientific terms) have the same meaning as ordinary technicians in the field to which the present disclosure belongs. It may also be understood that terms such as those defined in general dictionaries may be understood to have meanings consistent with those in the context of the current technology, and unless specifically defined as such, they may not be interpreted with idealized or overly formal meanings.

Figure 1:
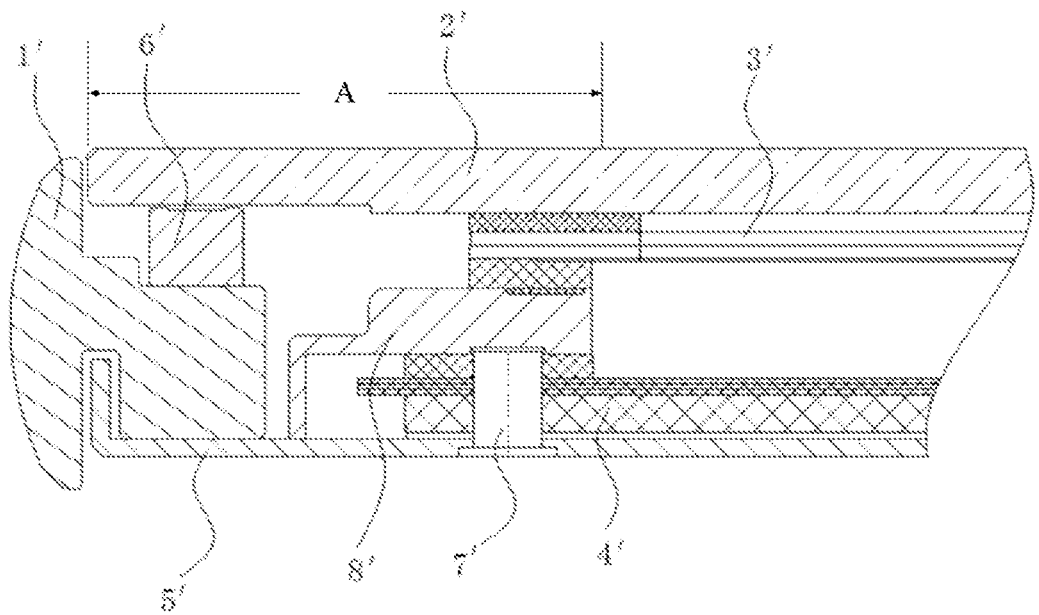
FIG. 1 is a structural schematic diagram of an interactive intelligent board in the current technology.
Figure 2:
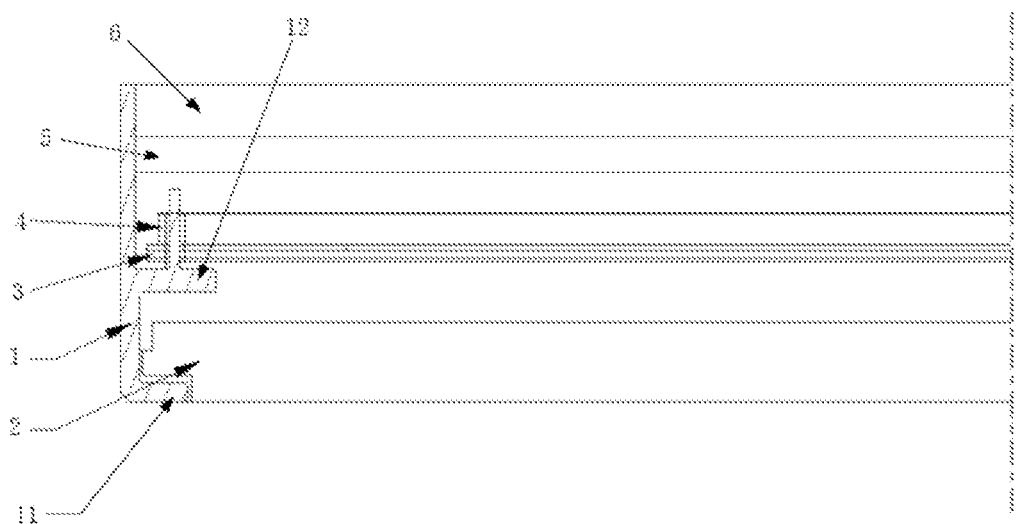
FIG. 2 is a structural schematic diagram of an interactive intelligent board in an embodiment of the present disclosure.

FIG. 2 is a structural schematic diagram of an interactive intelligent board according to an embodiment of the present disclosure. The interactive intelligent board includes a frame 1, a touch display assembly 2, an optical diaphragm 3, a diffuser plate 4, a luminous assembly 5, and a backplane 6:
  a first fixing part 11 and a second fixing part 12 are arranged on an inner wall of the frame 1 at an interval along a thickness direction of the touch display assembly 2;
  the touch display assembly 2 is fixedly arranged on the first fixing part 11;
  the optical diaphragm 3, the diffuser plate 4, the luminous assembly 5, and the backplane 6 are successively fixedly arranged on a side of the second fixing part 12 being away from the first fixing part 11.

In an embodiment, a display surface of the touch display assembly 2 faces the front of the interactive intelligent board. The front of the interactive intelligent board disclosed in this scheme refers to a side facing the user for displaying images, videos, and receiving touch operations.

In an embodiment, the interactive intelligent board body may include a touch recognition positioning module for recognizing a touch command, a control assembly for controlling a display screen of the touch display assembly 2 and responding to touch commands, a microphone for collecting nearby human or environmental sounds, a speaker for playing audio, a camera for collecting image information, a network module for communication, etc., without specifically limiting and repeating other modules herein.

Figure 3:
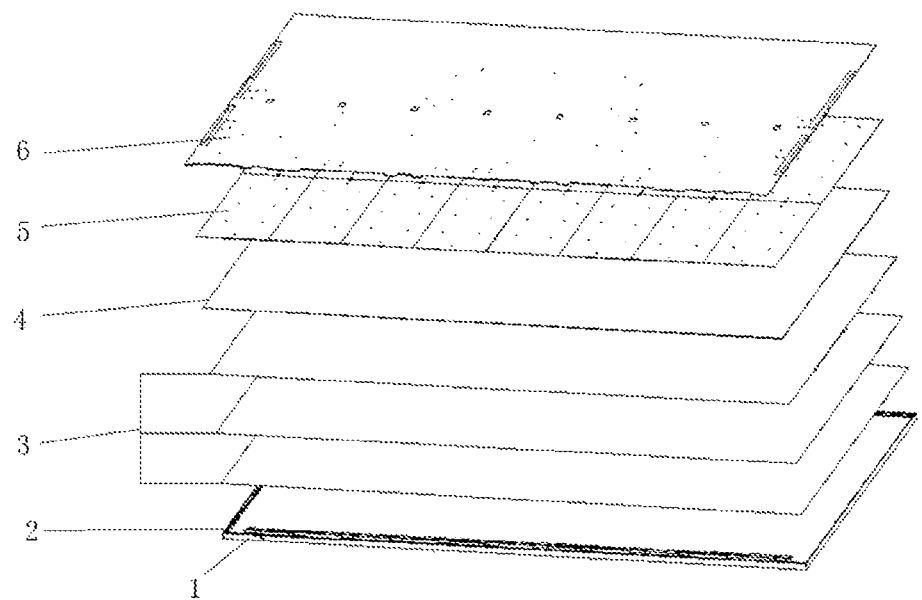
FIG. 3 is a schematic diagram of an assembly scheme in an embodiment of the present disclosure.

In an embodiment, FIG. 3 is a schematic diagram of an assembly scheme according to an embodiment of the present disclosure. The installation scheme of an interactive intelligent board in an embodiment of the present disclosure is as follows: firstly, placing an outer side of the first fixing part 11 of the frame 1 downwards, and then bonding the touch display assembly 2 onto an inner side of the first fixing part 11 through adhesive. The inner side of the first fixing part 11 is a side close to the display surface, the inner side of the first fixing part 11 is a side close to the second fixing part 12: the optical diaphragm and the diffuser plate 4 are arranged on a side of the second fixing part 12 being away from the first fixing part 11, and a combination of the luminous assembly 5 and the backplane 6 is successively invertedly arranged on an upward-facing end of the frame 1. The upward-facing end of the frame 1 refers to the end of the frame 1 facing upwards when an outer side of the first fixing part 11 of the frame 1 is placed downwards. The above installation scheme adopts an inverted installation scheme, which integrates the frame, the middle frame, and the fixing support into the frame 1, thereby reducing the number of assembly components and assembly difficulty, and improving assembly efficiency.

In an embodiment, because interactive intelligent boards are commonly used in fields such as group meetings, multiplayer learning, and multiplayer games, an implementation of the interactive intelligent board demands a high requirements for the size. Alternatively, the interactive intelligent board in the present disclosure may be a large-sized interactive intelligent board with a size larger than 75 inches, aiming to provide a better experience for multiplayer touching and viewing. However, such large-sized interactive intelligent boards are usually installed on walls or supported by supports. Due to the large size of their front face, if the thickness is also too large, it may create a heavy and bulky visual effect, which may greatly affect a visual experience of users. The structure of the interactive intelligent board in the present disclosure not only improves assembly efficiency but also reduce the need for the glass cover plate fixing bracket 6' and middle frame 8' in current technology. It greatly reduces the thickness of the interactive intelligent board. When it is installed on the wall or placed on the support, it may avoid creating a bulky visual effects for the user, significantly improving the visual experience of the user.

In an embodiment, the first fixing part 11 arranged on the inner wall of the frame 1 is used to fix the touch display assembly 2, and the second fixing part 12 is used to fix the optical diaphragm 3, preventing direct contact between the touch display assembly 2 and the optical diaphragm 3, thereby avoiding the need for a large adhesive area caused by using a fixing support and glue fixation. It also reduces the need for adding a middle frame to isolate the touch display assembly 2 and the optical diaphragm 3.

In an embodiment, the diffuser plate 4 may convert a point light source or a line light source into a surface light source, so that the brightness of pictures of the interactive intelligent board displayed become more uniform, thereby improving the display effect, and thus improving the visual experience of the user.

Furthermore, the first fixing part 11 extends into inside of the frame along an outer edge of the frame 1.

Alternatively, if the first fixing part 11 does not extend into inside of the frame along the outer edge of the frame 1, a part of side walls of the frame 1 protrudes from a display surface of the first fixing part 11, which means that there may be depressions between the first fixing part 11 and the inner side of the frame 1, causing the problem of difficult cleaning of dirt in the depressions. The first fixing part 11 extending along the outer edge of the frame 1 into inside of the frame can make the outer surface of the first fixing part 11 as flush as possible with the edge of the frame, thereby avoiding cleaning problems caused by depressions, and improving the appearance effect of the interactive intelligent board.

Furthermore, an outer surface of the first fixing part 11 and an outer edge of the frame 1 close to the first fixing part 11 form an outer surface of the frame 1. An edge of the touch display assembly 2 being away from the second fixing part 12 is provided with steps, and the steps are clamped with the first fixing part 11 to ensure that the display surface of the touch display assembly 2 is flush with the outer surface of frame 1 after being clamped.

In an embodiment, due to the need for inverted installation of each layer in the present disclosure, the outer surface of the touch display assembly 2 is flush with the outer surface of the frame 1, to improve the stability of subsequent layers when placed downwards.

Furthermore, the second fixing part 12 extends into inside of the frame from the middle of the inner side of the frame 1.

In an embodiment, the second fixing part 12 extending from the middle of the inner side of the frame 1 to the inner side of the frame enables the side of the frame 1 being away from the first fixing part 11 to still have sufficient installation space so as to facilitate the installation of the optical diaphragm 3, the diffuser plate 4, the luminous assembly 5, and the backplane 6, thereby improving the convenience of installation.

Furthermore, a protruded male plug 121 is arranged on a side of the second fixing part 12 being away from the first fixing part 11. The optical diaphragm 3 is provided with a first female receptor, and the diffuser plate 4 is provided with a second female receptor. The male plug 121 is successively inserted into the first female receptor and the second female receptor.

Figure 4:
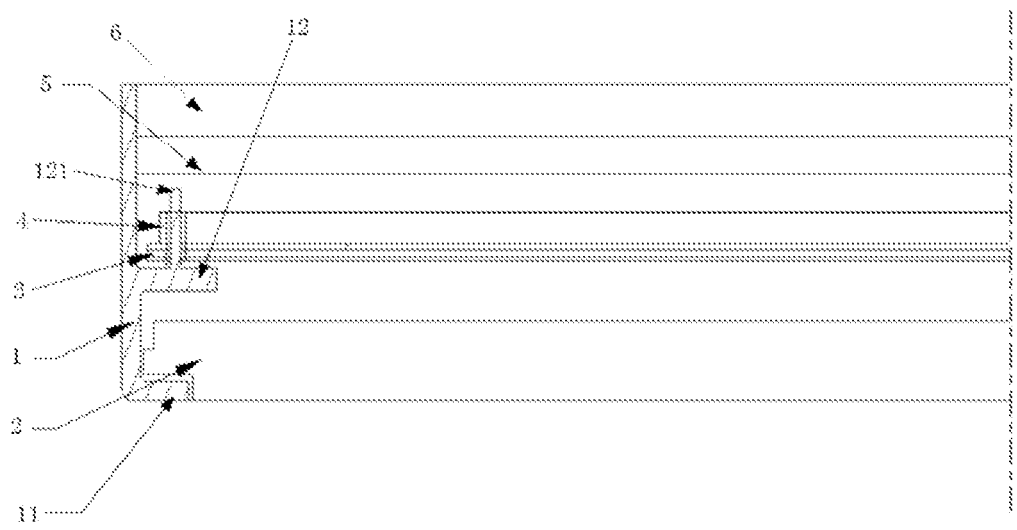
FIG. 4 is a structural schematic diagram of a male plug in an embodiment of the present disclosure.

In an embodiment, referring to FIG. 4, it is a structural schematic diagram of the male plug 121 in the first embodiment of the present disclosure. The male plug 121 is adaptively inserted into female receptors of the optical diaphragm 3 and the diffuser plate 4, which can avoid the left and right shaking of the optical diaphragm 3 and the diffuser plate 4, and further improve the stability of fixing the optical diaphragm 3, thereby improving its astigmatism and uniformity effect, and improving the display effect of the interactive intelligent board.

In an embodiment, a length of the male plug 121 may be slightly higher than the total thickness of the optical diaphragm 3 and the diffuser plate 4, so that after the male plug 121 is adaptively inserted into the female receptors of the optical diaphragm 3 and the diffuser plate 4, the top of the male plug 121 extends out of the diffuser plate 4. In actual production, a clamping cap may be used to clamp the top of the male plug 121 and extend out of the part of the diffuser plate 4, so that the clamping cap precisely fixes the optical diaphragm 3 and the diffuser plate 4 on the male plug 121, thereby preventing the optical diaphragm 3 and the diffuser plate 4 from sliding in the thickness direction of the optical diaphragm 3. After the backplane 6 is fixedly arranged on the frame, a fixed width gap is maintained between the backplane 6 and the optical diaphragm 3 to form a mixed light distance. In addition, a screw thread may also be arranged at a part where the diffuser plate 4 extends from the top of the male plug 121, and a nut that is suitable for the screw thread may be tightened at a screw thread position, so that the nut precisely fixes the optical diaphragm 3 and the diffuser plate 4 on the male plug 121, which avoids the optical diaphragm 3 and the diffuser plate 4 from sliding in the thickness direction of the optical diaphragm 3.

Figure 5:
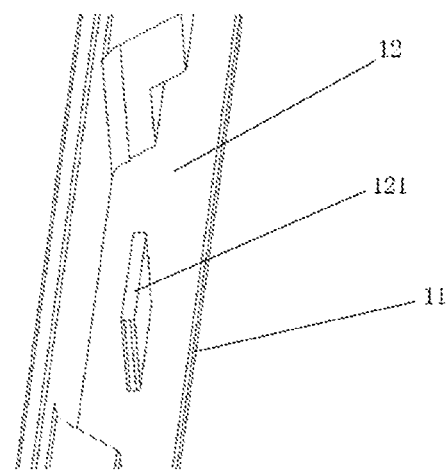
FIG. 5 is a structural schematic diagram of a male plug in an embodiment of the present disclosure.

Preferably, referring to FIG. 5, it is a structural schematic diagram of a male plug in an embodiment of the present disclosure. The male plug 121 may be several discontinuous sheet shaped protrusions.

Figure 6:
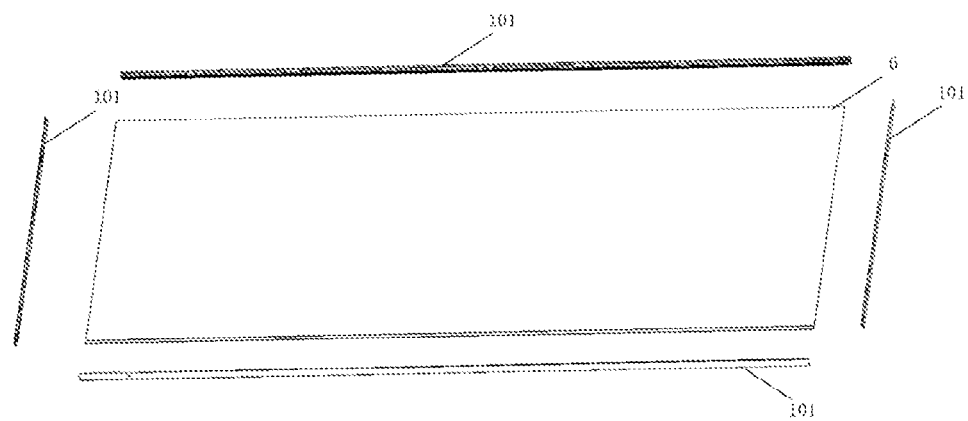
FIG. 6 is a structural schematic diagram of a frame in an embodiment of the present disclosure.

Furthermore, referring to FIG. 6, it is a structural schematic diagram of a frame in an embodiment of the present disclosure. The frame 1 includes four sub-frames 101 located on respective sides, and the four sub-frames 101 are successively connected end to end to form a rectangular frame and form four corners.

Figure 7:
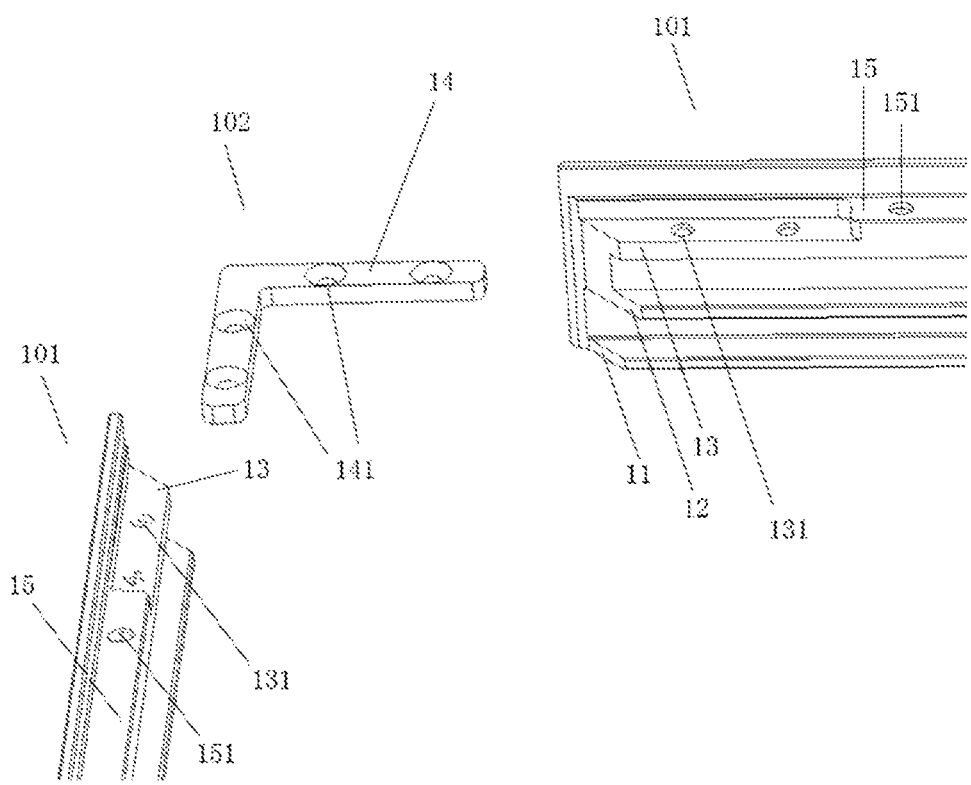
FIG. 7 is a structural schematic diagram of a frame in an embodiment of the present disclosure.

Referring to FIG. 7, it is a structural schematic diagram of a frame in an embodiment of the present disclosure. For ease of description, the diagram shows two adjacent sub-frames 101 and a corner fixing member 102. The end structure of the remaining sub-frames 101 is the same as that shown in FIG. 7. Both ends of each sub-frame 101 are provided with sub-frame fixing plates 13 (not shown in FIG. 6), and sub-frame fixing screw holes 131 are respectively arranged on the sub-frame fixing plates 13.

The frame 1 further includes four corner fixing members 102 for fixing the sub-frame 101 (not shown in FIG. 6).

Each of the corner fixing members 102 includes two fixing pieces 14, an end of one fixing piece 14 is fixed to an end of the other fixing piece 14 so that a right angle is formed between the two fixing pieces 14; two fixing pieces 14 are respectively provided with corner fixing screw holes 141 having same size and corresponding positions as the sub-frame fixing screw holes 131.

The corner fixing members 102 are respectively arranged on the sub-frame fixing plates 13 at the corners, so that the sub-frame fixing screws successively pass through the corner fixing screw holes 141 and the sub-frame fixing screw holes 131. The corner fixing members 102 are respectively fixedly arranged on the corners formed by the sub-frame 101.

In an embodiment, referring to FIG. 7, adjacent ends of two sub-frames 101 is pressed tightly to form a vertical corner. The sub-frame fixing plates 13 on the two sub-frames 101 form a right angle corner. At this time, the corner fixing member 102 is placed above the right-angle corner and passes through each corner fixing screw hole 141 of the corner fixing member 102 through the frame fixing screws to fix the two sub-frames 101 downwards, thereby improving the stability and disassembly of frame 1.

In an embodiment, referring to FIG. 7, an extension direction of the sub-frame fixing plate 13 is the same as that of the second fixing part 12. At this time, a groove with a certain width is formed between the sub-frame fixing plate 13 and the second fixing part 12. Alternatively, a width of the groove may be set to be consistent with the total thickness of the optical diaphragm 3 and the diffuser plate 4, so that the edges of the optical diaphragm 3 and the diffuser plate 4 may precisely fit into the groove, and further prevent the optical diaphragm 3 and diffuser plate 4 from sliding in the thickness direction of the optical diaphragm 3.

Furthermore, an edge of the backplane 6 is provided with backplane screw holes: each of the sub-frames 101 is provided with a backplane fixing plate 15, and a direction of the backplane fixing plate 15 is parallel to an edge of the sub-frame 101. The backplane fixing plate 15 is provided with backplane fixing screw holes 151 that have the same shape as the backplane screw holes and are positioned accordingly. This may allow the backplane fixing screws to pass through the backplane screw holes and the backplane fixing screw holes 151, securing the backplane 15 onto the rectangular frame formed by the sub-frame 101.

In an embodiment, referring to FIG. 7, a backplane fixing plate 15 extending inward is arranged at an end of the frame 1 being away from the first fixing part 11. The backplane 6 is fixed to the frame 1 through the backplane fixing screws, thereby enabling the backplane 6 to cover and fix the inner luminous assembly 5. This may improve the stability of the interactive intelligent board.

Preferably, in the optional implementation process, in addition to screws, clamping holes may also be arranged on the backplane 6 and the backplane fixing plate 15. The backplane 6 may be fixed by other fasteners such as buckles. Further details are not repeated here.

Furthermore, the backplane fixing plate 15 on the sub-frame 101 has a height difference from the sub-frame fixing plate 13, and the backplane fixing plate 15 is closer to an outer side of the frame 1 so that an outer surface of the corner fixing member 102 is flush with an outer surface of the backplane fixing plate 15 after the corner fixing member 102 is fixedly arranged on the rectangular frame.

In an embodiment, after the installation of the corner fixing member 102, the outer surface of the corner fixing member 102 is flush with the outer surface of the backplane fixing plate 15, which allows for more stable placement and fixation of the backplane 6, thereby preventing the backplane 6 from warping or shaking after being installed.

Preferably, an edge of the frame close to the backplane fixing plate 15 is slightly higher than the backplane fixing plate 15, so that after the backplane 6 is fixedly arranged on the rectangular frame formed by the sub-frame 101, the outer surface of the backplane 6 is flush with the edge of the frame 1 close to the backplane fixing plate 15, which can avoid material waste of the protruding part of the frame 1. Moreover, during the assembly process, it may place various components inside the frame 1 by either a robotic arm or human hand. Keeping the outer surface of the frame 1 aligned with the backplane 6 reduces the height obstruction of the frame 1 and thus reduces the assembly difficulty. Furthermore, the touch display assembly 2 includes an LCD screen, a touch capacitor, and a glass cover that are successively stacked.

In an embodiment, after being assembled, the touch display assembly 2 successively includes a glass cover plate, a touch capacitor, and an LCD screen from the outer surface of the frame 1 to the inner surface. At this time, the touch display assembly 2, including the glass cover plate, is fixed inward by the first fixing part 11. This avoids the need for a large amount of glue and a large adhesive area to firmly adhere the glass cover plate to the outer side of the frame 1. The width of the black edge of the frame 1 has been greatly reduced while ensuring its fixation and firmness.

Preferably, the glass cover is formed of tempered glass, which can greatly improve the robustness of interactive intelligent boards.

Further, the optical diaphragm 3 includes at least one of a diffuser, a brightness enhancement film (BEF), or a reflector.

Preferably, the optical diaphragm 3 has a three-layer structure. The three-layer structure includes a diffuser, a brightness enhancement film, and a reflector. The structure may allow the incident light from a point light source to be evenly diffused as divergent light, eliminating the light spots produced by the luminous assembly and widening an irradiation angle. It effectively eliminates the lighting blind spot.

In summary, for the interactive intelligent board according to the embodiment of the present disclosure, the touch display assembly is fixed by the first fixing part arranged on the inner wall of the frame, and the optical diaphragm is fixed by the second fixing part to prevent direct contact between the touch display assembly and the optical diaphragm, thereby avoiding the need for a large adhesive area caused by using a fixing support and glue fixation. It also avoids the need for adding a middle frame to isolate the touch display assembly and the optical diaphragm, thereby solving the problem of wider frames and a smaller effective display area ratio caused by the use of the middle frame to press the optical diaphragm in the current technology. Extending the first fixing part along the outer edge of the frame towards the inside may allow the display surface of the first fixing part to align as closely as possible with the edge of the frame. This avoids the cleaning problems caused by depressions and improves the appearance effect of the interactive intelligent board. It also improves the convenience of user operation. By making the outer surface of the touch display assembly flush with the outer surface of the frame, it is easy to improve the stability of subsequent layers when placed downwards. By arranging a male plug on the second fixing part and corresponding female receptors on the optical diaphragm and diffuser plate, the lateral movement of the optical diaphragm and diffuser plate may be prevented. This further improves the stability of the optical diaphragm fixation, improving its astigmatism and uniformity effects, and consequently improving the display effect of the touch display assembly. Further, by securely fastening screws to the frame and the backplane, the stability of the structure of the interactive intelligent board may be improved. This also improves the convenience and efficiency of the installation.

The above are preferred embodiments of the present disclosure and do not limit the patent scope of the present disclosure. Any equivalent structure or equivalent process transformation made by using the description and accompanying drawings of the present disclosure, or directly or indirectly applied in other related technical fields, are equally included in the claimed scope of the present disclosure.

What is claimed is:

1. An interactive intelligent board, comprising:
   a frame;
   a touch display assembly;
   an optical diaphragm;
   a diffuser plate;
   a luminous assembly; and
   a backplane,
   wherein a first fixing part and a second fixing part are arranged on an inner wall of the frame, and wherein the second fixing part is located away from the first fixing part at an interval along a thickness direction of the touch display assembly;
   the touch display assembly is fixedly arranged on the first fixing part;
   the optical diaphragm, the diffuser plate, the luminous assembly, and the backplane are successively fixedly arranged on a side of the second fixing part being away from the first fixing part.

2. The interactive intelligent board of claim 1, wherein the first fixing part extends into inside of the frame along an outer edge of the frame.

3. The interactive intelligent board of claim 2, wherein an outer surface of the first fixing part and an outer edge of the frame close to the first fixing part form an outer surface of the frame, an edge of the touch display assembly being away from the second fixing part is provided with steps, and the steps are clamped with the first fixing part so that a display surface of the touch display assembly is flush with the outer surface of frame after being clamped.

4. The interactive intelligent board of claim 1, wherein the second fixing part extends into inside of the frame from the middle of the inner side of the frame.

5. The interactive intelligent board of claim 4, wherein a protruded male plug is arranged on a side of the second fixing part being away from the first fixing part; the optical diaphragm is provided with a first female receptor, and the diffuser plate is provided with a second female receptor, the male plug is successively inserted into the first female receptor and the second female receptor.

6. The interactive intelligent board of claim 1, wherein the frame includes four sub-frames located on respective sides, the four sub-frames are successively connected end to end to form a rectangular frame and form four corners;

both ends of each of the sub-frames are provided with sub-frame fixing plates, and sub-frame fixing screw holes are respectively arranged on the sub-frame fixing plates;

the frame further comprises four corner fixing members for fixing the sub-frames;

each of the corner fixing members includes two fixing pieces, an end of one of the two fixing pieces is fixed to an end of another one of the two fixing pieces so that a right angle is formed between the two fixing pieces; the two fixing pieces are respectively provided with corner fixing screw holes having same size and corresponding positions as the sub-frame fixing screw holes;

the corner fixing members are respectively arranged on the sub-frame fixing plates at the corners, so that the sub-frame fixing screws successively pass through the corner fixing screw holes and the sub-frame fixing screw holes, and the corner fixing members are respectively fixedly arranged on the corners formed by the sub-frames.

7. The interactive intelligent board of claim 6, wherein an edge of the backplane is provided with backplane screw holes;

each of the sub-frames is provided with a backplane fixing plate, and an arrangement direction of the backplane fixing plate is parallel to an edge of the sub-frame; the backplane fixing plate is provided with backplane fixing screw holes having same shape and corresponding positions as the backplane screw holes, so that the backplane fixing screws successively pass through the backplane screw holes and the backplane fixing screw holes, and fix the backplane on a rectangular frame formed by the sub-frames.

8. The interactive intelligent board of claim 7, wherein the backplane fixing plate on the sub-frame has a height difference from the sub-frame fixing plate, and the backplane fixing plate is closer to an outer side of the frame so that an outer surface of the corner fixing member is flush with an outer surface of the backplane fixing plate after the corner fixing member is fixedly arranged on the rectangular frame.

9. The interactive intelligent board of claim 1, wherein the touch display assembly comprises an LCD screen, a touch capacitor, and a glass cover that are successively stacked.

10. The interactive intelligent board of claim 1, wherein the optical diaphragm comprises at least one of a diffuser, a brightness enhancement film, or a reflector.

* * * * *